US012768412B2

United States Patent

(12) United States Patent
Strieter et al.

(10) Patent No.: US 12,768,412 B2
(45) Date of Patent: Oct. 20, 2026

(54) ELECTROMECHANICAL BRAKE SYSTEM HAVING MULTIPLE SCREW-NUT MECHANISMS

(71) Applicant: HL MANDO CORPORATION, Gyeonggi-do (KR)

(72) Inventors: Troy Strieter, Bay City, MI (US); Jeff Lauman, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 317 days.

(21) Appl. No.: 18/509,295

(22) Filed: Nov. 14, 2023

(65) Prior Publication Data

US 2025/0154994 A1 May 15, 2025

(51) Int. Cl.

| | |
|---|---|
| ***F16D 125/40*** | (2012.01) |
| ***F16D 65/18*** | (2006.01) |
| ***F16D 121/24*** | (2012.01) |
| ***F16D 125/48*** | (2012.01) |

(52) U.S. Cl.

CPC .......... *F16D 65/18* (2013.01); *F16D 2121/24* (2013.01); *F16D 2125/40* (2013.01); *F16D 2125/48* (2013.01)

(58) Field of Classification Search

CPC .. F16D 65/18; F16D 2121/24; F16D 2125/40; F16D 2125/48

See application file for complete search history.

(56) References Cited

U.S. PATENT DOCUMENTS

| | | | | |
|---|---|---|---|---|
| 12,135,065 | B2 * | 11/2024 | Gerber | F16D 65/18 |
| 2023/0012601 | A1 | 1/2023 | Gerber et al. | |

FOREIGN PATENT DOCUMENTS

| | | | | |
|---|---|---|---|---|
| CN | 104389927 | 3/2015 | | |
| CN | 204344762 U * | 5/2015 | | F16D 65/14 |
| JP | 4-125351 | 4/1992 | | |
| JP | 2017-128285 | 7/2017 | | |
| JP | 6633427 | 12/2019 | | |
| KR | 10-2022403 | 9/2019 | | |

OTHER PUBLICATIONS

Office Action (1st) dated Jun. 9, 2026 for Korean Patent Application No. 10-2024-0046980 and its English translation provided by Applicant's foreign counsel.

* cited by examiner

*Primary Examiner* — Tinh T Dang

(74) *Attorney, Agent, or Firm* — WOMBLE BOND DICKINSON (US) LLP

(57) ABSTRACT

An electromechanical brake system may comprise: a pair of screw-nut mechanisms comprising first and second screw-nut mechanisms, each screw-nut mechanism comprising a rotatable body configured to be rotatable and a translatable body operably coupled with the rotatable body, the translatable body configured to be axially translatable relative to the rotatable body to move a brake pad assembly according to rotation of the rotatable body, wherein the rotatable body of the first screw-nut mechanism is provided with the first gear and the rotatable body of the second screw-nut mechanism is provided with the second gear; an actuator assembly configured to provide a torque; and a drive gear rotatably engaged between the first gear of the rotatable body of the first screw-nut mechanism and the second gear of the rotatable body of the second screw-nut mechanism and operably connected to the actuator assembly to be rotated by the torque of the actuator.

16 Claims, 4 Drawing Sheets

10

10

ELECTROMECHANICAL BRAKE SYSTEM HAVING MULTIPLE SCREW-NUT MECHANISMS

TECHNICAL FIELD

Some embodiments of the present disclosure generally relate to an electromechanical brake system having multiple screw-nut mechanisms, in particular, to an electromechanical brake system having multiple screw-nut mechanisms operably connected by a drive gear driven by a motor.

BACKGROUND

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock, and electric or brake-by-wire brake systems. For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In an electric brake system, the application and release of the brake is controlled by an electric caliper or motor via an electrical signal.

These electric brake systems typically include an electromechanical actuator connected to a brake caliper either by a cable, as the drum in head, or directly attached to the brake caliper. The actuator converts electrical power to rotational mechanical output power for moving the cable or drive screw and applying the brakes. Generally, the electro-mechanical actuator includes an electric motor and a mechanical assembly for achieving the necessary load transfer.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

According to some embodiments of the present disclosure, an electromechanical brake system may comprise: a pair of screw-nut mechanisms comprising first and second screw-nut mechanisms, each screw-nut mechanism comprising a rotatable body configured to be rotatable and a translatable body operably coupled with the rotatable body, the translatable body configured to be axially translatable relative to the rotatable body to move a brake pad assembly according to rotation of the rotatable body, wherein the rotatable body of the first screw-nut mechanism is provided with the first gear and the rotatable body of the second screw-nut mechanism is provided with the second gear; an actuator assembly configured to provide a torque; and a drive gear rotatably engaged between the first gear of the rotatable body of the first screw-nut mechanism and the second gear of the rotatable body of the second screw-nut mechanism and operably connected to the actuator assembly to be rotated by the torque of the actuator.

The drive gear may be configured to rotate both the first gear of the rotatable body of the first screw-nut mechanism and the second gear of the rotatable body of the second screw-nut mechanism simultaneously by the torque of the actuator to rotate the rotatable body of the first screw-nut mechanism and the rotatable body of the second screw-nut mechanism simultaneously.

The translatable body of the first screw-nut mechanism and the translatable body of the second screw-nut mechanism may be operably coupled to the brake pad assembly so that the translatable body of the first screw-nut mechanism and the translatable body of the second screw-nut mechanism simultaneously move the brake pad assembly according to the rotation of the rotatable body of the first screw-nut mechanism and the rotatable body of the second screw-nut mechanism to apply or release brake.

The first gear may be fixed to the rotatable body of the first screw-nut mechanism, and the second gear may be fixed to the rotatable body of the second screw-nut mechanism.

Teeth of the first gear may be directly formed on the rotatable body of the first screw-nut mechanism, and teeth of the second gear may be directly formed on the rotatable body of the second screw-nut mechanism.

Diameters of the first gear of the rotatable body of the first screw-nut mechanism and the second gear of the rotatable body of the second screw-nut mechanism may be larger than a diameter of the drive gear rotatably engaged between the first gear and the second gear.

The rotatable body and the translatable body of the first screw-nut mechanism and the rotatable body and the translatable body of the second screw-nut mechanism may have threaded grooves, and a threaded direction of the threaded grooves of the rotatable body and the translatable body of the first screw-nut mechanism and a threaded direction of the threaded grooves of the rotatable body and the translatable body of the second screw-nut mechanism may be same as each other.

The drive gear, the first gear of the rotatable body of the first screw-nut mechanism and the second gear of the rotatable body of the second screw-nut mechanism may be arranged on a same plane as each other.

The actuator assembly may comprise: a motor having a motor shaft, and a belt drive mechanism operably connecting between the motor shaft and the drive gear engaged between the first and second gears of the rotatable bodies of the first and second screw-nut mechanisms.

The belt drive mechanism may comprise: a drive belt; a drive pulley provided on the motor shaft; and a driven pulley connected to the drive pulley of the motor shaft via the drive belt, wherein the driven pulley is provided on an intermediate shaft operably connecting between the belt drive mechanism and the drive gear.

A diameter of the drive pulley provided on the motor shaft may be smaller than a diameter of the driven pulley provided on the intermediate shaft operably connecting between the belt drive mechanism and the drive gear.

The intermediate shaft may have a first portion where the driven pulley of the belt drive mechanism connected to the drive pulley of the motor shaft is provided and a second portion where the drive gear engaged between the first and second gears of the rotatable bodies of the first and second screw-nut mechanisms is provided.

The driven pulley of the belt drive mechanism connected to the drive pulley of the motor shaft via the drive belt may be fixed to the intermediate shaft operably connecting between the belt drive mechanism and the drive gear.

The intermediate shaft operably connecting between the belt drive mechanism and the drive gear may have a flange protruding radially from an outer circumferential surface of the intermediate shaft to support at least a part of one side of the driven pulley of the belt drive mechanism fixedly coupled to the intermediate shaft.

The driven pulley provided on the intermediate shaft operably connecting between the belt drive mechanism and the drive gear may have an inner wall fixedly coupled to the intermediate shaft and an outer wall having an outer surface rotatably engaged with the drive belt, and one or more bearings configured to rotatably support the inner wall of the driven pulley may be disposed inside a space formed between the inner wall and the outer wall of the driven pulley.

The rotatable body of the first screw-nut mechanism may have an inner race of a first bearing rotatably supporting the rotatable body of the first screw-nut mechanism and the first gear rotatably engaged with the drive gear, and the rotatable body of the second screw-nut mechanism have an inner race of a second bearing rotatably supporting the rotatable body of the second screw-nut mechanism and the second gear rotatably engaged with the drive gear.

A diameter of the first gear of the first screw-nut drive mechanism may be larger than an outer diameter of the rotatable body of the first screw-nut drive mechanism, and a diameter of the second gear of the second screw-nut drive mechanism may be larger than an outer diameter of the rotatable body of the second screw-nut drive mechanism.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
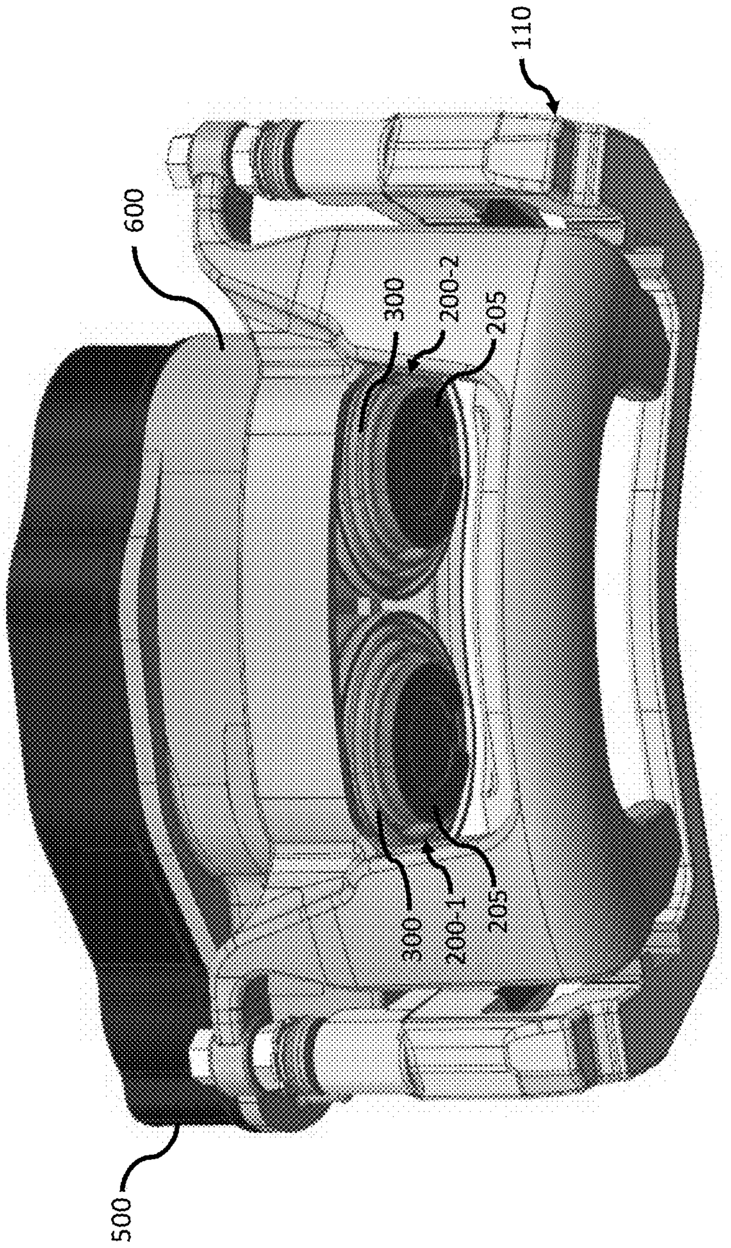
FIG. 1 is a perspective view of an electromechanical brake system according to an exemplary embodiment of the present disclosure.
Figure 2:
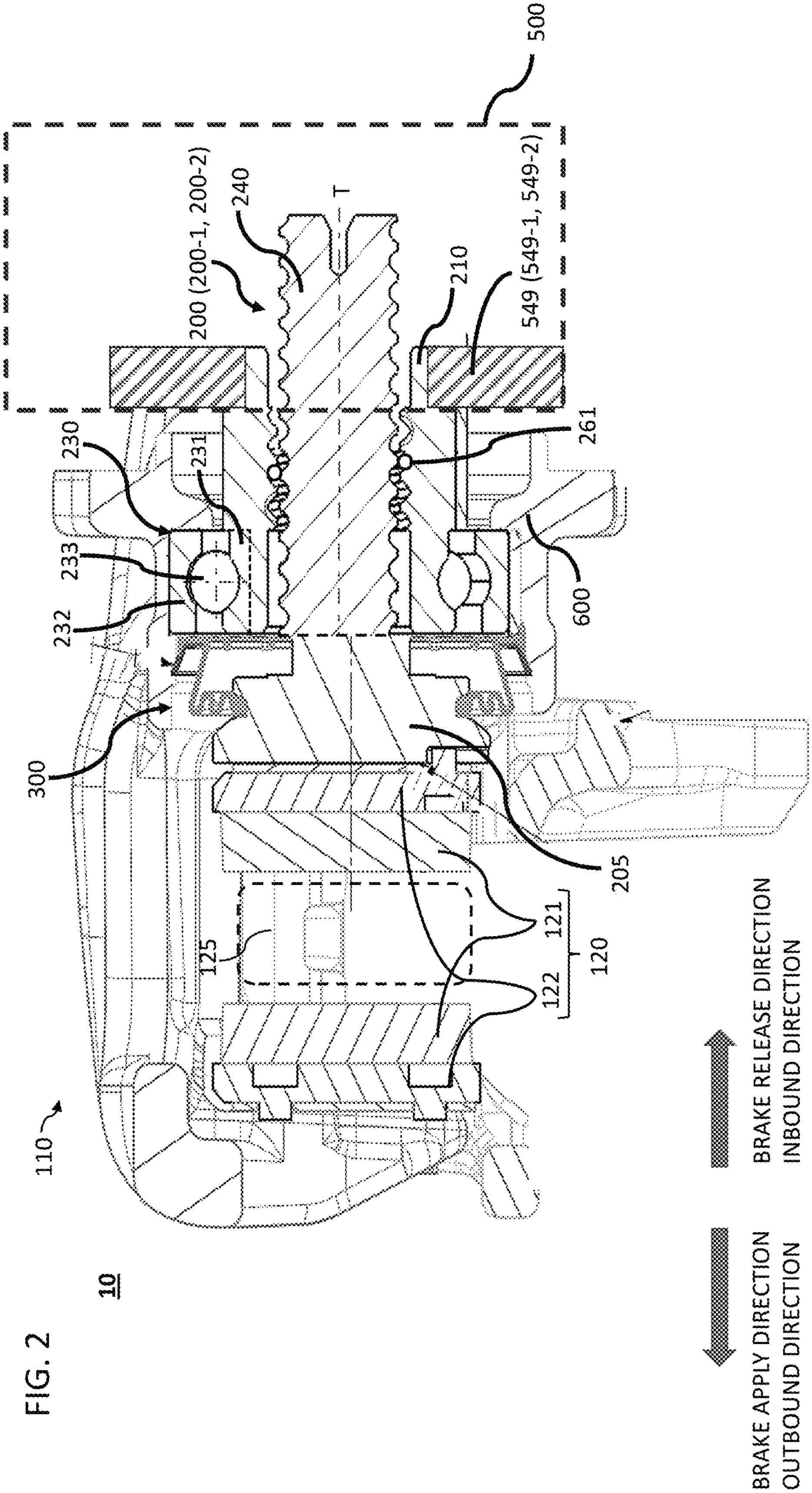
FIG. 2 is a cross-sectional view of an electromechanical brake system in a vertical plane according to an exemplary embodiment of the present disclosure.
Figure 3:
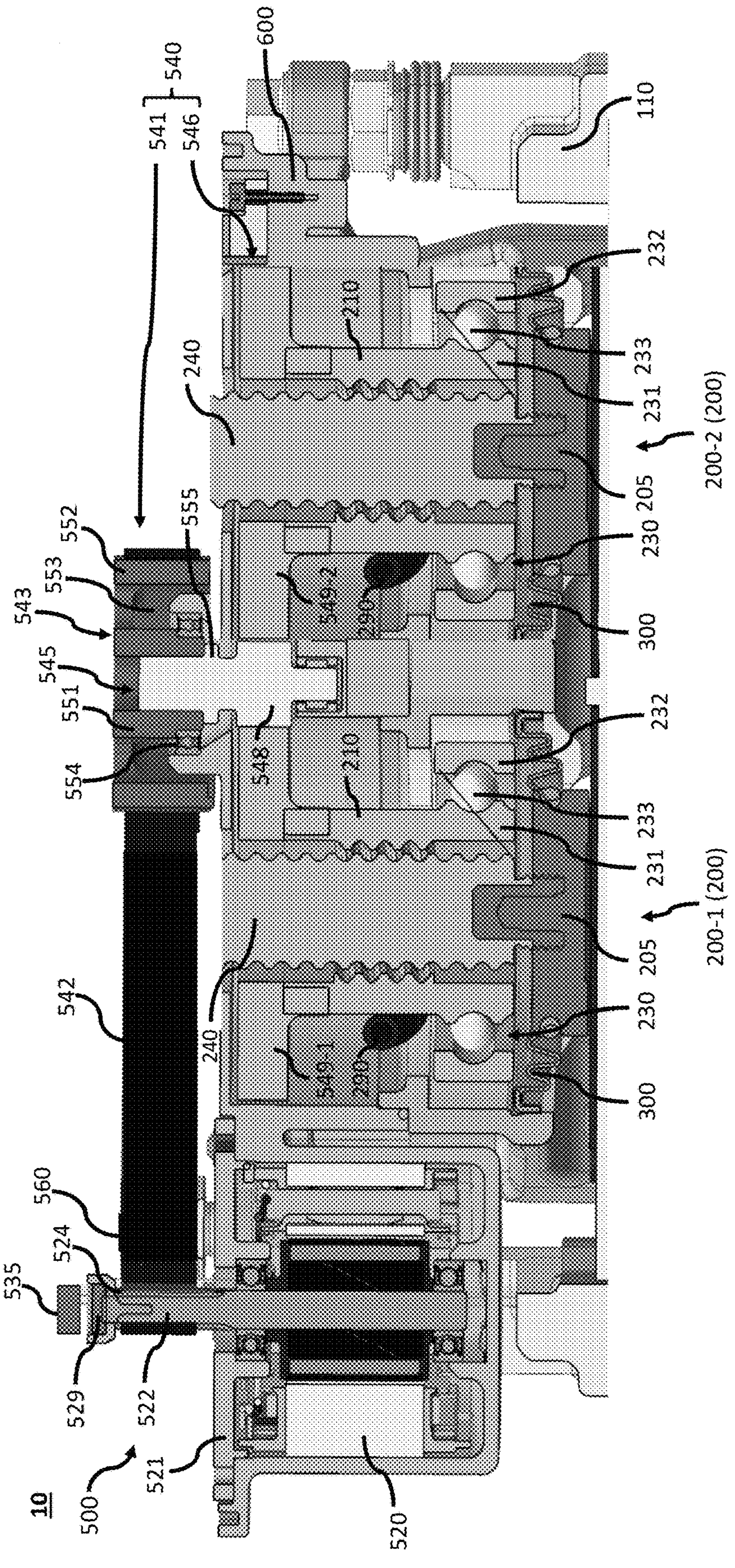
FIG. 3 is a partial cross-sectional view of an electromechanical brake system in a horizontal plane according to an exemplary embodiment of the present disclosure.
Figure 4:
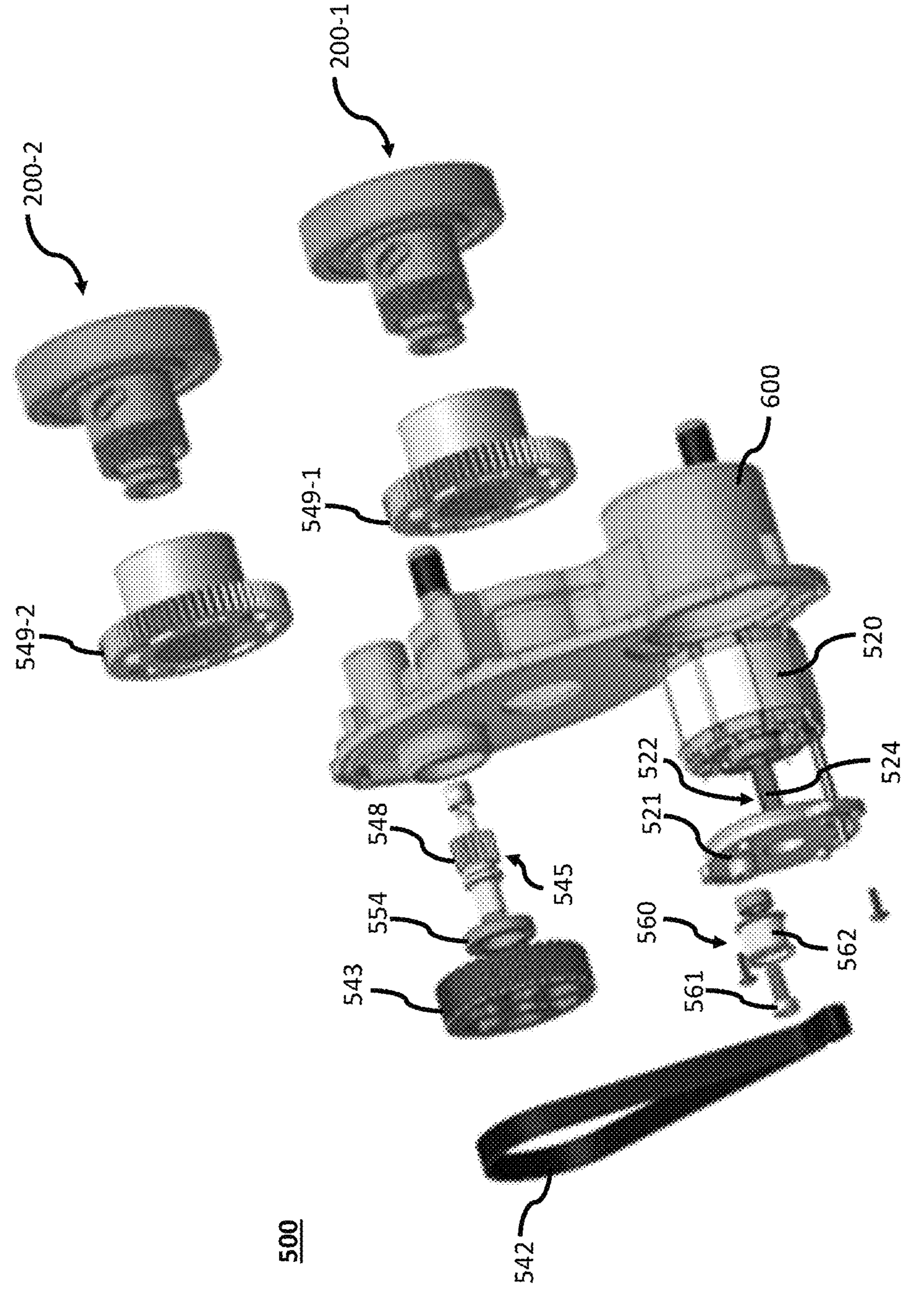
FIG. 4 is an exploded view of an actuator assembly according to an exemplary embodiment of the present disclosure.

FIG. 1 is a perspective view of an electromechanical brake system according to an exemplary embodiment of the present disclosure. FIG. 2 is a cross-sectional view of an electromechanical brake system in a vertical plane according to an exemplary embodiment of the present disclosure. FIG. 3 is a partial cross-sectional view of an electromechanical brake system in a horizontal plane according to an exemplary embodiment of the present disclosure. FIG. 4 is an exploded view of an actuator assembly according to an exemplary embodiment of the present disclosure.

Referring to FIG. 2, an electromechanical brake system 10 may include a brake caliper 110. The brake caliper 110 may be mounted in a floating manner by means of a brake carrier. The brake caliper 110 may be connected to any non-rotating or non-moving part of a vehicle. When the vehicle is in motion, a brake rotor 125 may rotate with a wheel about an axle of the vehicle. A brake pad assembly (or brake lining assembly) 120 is provided in the brake caliper 110, and includes a brake pad or lining 121 and a brake pad carrier (or a backing plate) 122. The brake caliper 110 may include a bridge with fingers, and the fingers of the brake caliper 110 may be in contact with the brake pad carrier 122. The brake pad 121 is disposed with a small air clearance on a side of the brake rotor 125, such as a brake disc, in a release position so that no significant residual drag moment occurs. The brake pad carrier 122 is disposed between the brake pad 121 and a piston or brake pad footing 205, the brake pad 121 and the brake pad carrier 122 of the brake pad assembly 120 move jointly together, and the movement of the brake pad carrier 122 causes the brake pad 121 to move with respect to the brake rotor 125.

The brake system 10 may comprise one or more drive mechanisms 200 (e.g. one or more nut-screw mechanisms such as ball nut-screw mechanisms) each configured to convert rotary motion generated by an actuator assembly 500 into linear motion in order to move the brake pad assembly 120 toward or away from the brake rotor 125 in an axial direction.

The drive mechanisms 200 may be implemented as multiple drive mechanisms. For example, as shown in FIGS. 1 and 3, the drive mechanisms 200 may be dual drive mechanisms comprising a first drive mechanism 200-1 and a second drive mechanism 200-2. Both of the first drive mechanism 200-1 and the second drive mechanism 200-2 are in communication with the actuator assembly 500. When the first drive mechanism 200-1 and the second drive mechanism 200-2 are driven by one single actuator assembly 500 in one direction for applying brake, the brake pad 121 is urged against the brake rotor 125 for applying a braking friction force to the brake rotor 125 by both the first drive mechanism 200-1 and the second drive mechanism 200-2. When the first drive mechanism 200-1 and the second drive mechanism 200-2 are driven by one single actuator assembly 500 in the other direction for releasing a brake clamping force, the brake pad 121 is moved away from the brake rotor 125 to release the brake by both the first drive mechanism 200-1 and the second drive mechanism 200-2.

FIG. 2 shows a cross-sectional view of one of dual drive mechanisms including a first and second drive mechanisms included in an electromechanical brake system according to an exemplary embodiment of the present disclosure.

Each drive mechanism 200 (e.g. the first drive mechanism 200-1 or the second drive mechanism 200-2) may include a rotatable body 210 and a translatable body 240. For example, the rotatable body 210 may comprise a nut or a ball nut and the translatable body 240 may comprise a screw or a ball screw, although not required. The drive mechanism 200 (200-1, 200-2) may be contained within a housing 600. The rotatable body 210 and the translatable body 240 may be concentrically mounted in a cavity formed by an inner wall of the housing 600. The housing 600 may be fixedly coupled with the brake caliper 110.

The rotatable body 210 is operably coupled to the actuator assembly 500, and is configured to be rotatable by actuation of the actuator assembly 500 or force generated by the actuator assembly 500. For example, the rotatable body 210 is directly or indirectly coupled to the actuator assembly 500 through one or more gears and/or belts, any other connecting means and combination thereof. The actuator assembly 500 and the coupling and operation between the rotatable body 210 and the actuator assembly 500 according to an embodiment of the present disclosure will be described below in details with reference to FIGS. 3 and 4.

The actuator assembly 500 rotates the rotatable body 210 of the drive mechanism 200 (200-1, 200-2), and then the drive mechanism 200 (200-1, 200-2) converts the rotary motion of the rotatable body 210 to the linear motion of the piston or brake pad footing 205 to move the brake pad assembly 120 between its brake apply and release positions. For example, the actuation of the actuator 500 causes the rotatable body 210 to rotate, and the rotation of the rotatable body 210 causes the translatable body 240 to be linearly moved. Specifically, the rotatable body 210 can rotate relative to the housing 600, and the rotation of the rotatable body 210 relative to the housing 600 causes the translatable body 240 to advance or retract axially depending on a direction of rotation of the rotatable body 210. As the rotatable body 210 rotates in an expanding direction, the translatable body 240 linearly translates with respect to the rotatable body 210 and the housing 600 so that the translatable body 240 can translate out from the rotatable body 210 and the housing 600 towards the brake rotor 125. As the rotatable body 210 rotates in a collapsing direction, the translatable body 240 linearly translates with respect to the rotatable body 210 and the housing 600 so that the translatable body 240 can linearly move toward the rotatable body 210 and the housing 600 in a direction away from the brake rotor 125.

The piston or brake pad footing 205 is fixedly coupled to the translatable body 240 so that the piston or brake pad footing 205 can be linearly movable together with the translatable body 240. Although FIGS. 2 and 3 illustrate that the piston or brake pad footing 205 is a separate element from the translatable body 240 of the drive mechanism 200 (200-1, 200-2), the piston or brake pad footing 205 and the translatable body 240 of the drive mechanism 200 (200-1, 200-2) may be integrally formed as one single piece. When the drive mechanism 200 (200-1, 200-2) is in the expanded state, the piston or brake pad footing 205 pushes or clamps the brake pad assembly 120 toward the brake rotor 125. When the drive mechanism 200 (200-1, 200-2) is in the collapsed state, the piston or brake pad footing 205 moves away from the brake rotor 125.

While the expanding or collapsing direction depends upon whether the nut or ball nut of the rotatable body 210 and the screw or ball screw of the translatable body 240 are left-handed or right-handed, a specific direction is not critical to some embodiments of the present disclosure, and most embodiments of the present disclosure can work with either.

The rotatable body 210 may have a tubular shape with axially open ends, and the translatable body 240 is received within an inside space of the rotatable body 210. The rotatable body 210 and the translatable body 240 are operably connected to each other such that while the rotatable body 210 rotates, the translatable body 240 is linearly movable relative to the rotatable body 210. In other words, the translatable body 240 is slidable with respect to the rotatable body 210, but the translatable body 240 cannot be rotatable relative to the rotatable body 210, and therefore as the rotatable body 210 rotates, the translatable body 240 is linearly moved. For example, the translatable body 240 has a structure configured to prevent the translatable body 240 from rotating relative to the rotatable body 210 while allowing the translatable body 240 to translate in the axial direction.

At least a part of the translatable body 240 is retained within the rotatable body 210. The rotatable body 210 has an internally-threaded track groove and the translatable body 240 has an externally-threaded track groove for a rollable body arrangement of rollable bodies 261 (e.g. balls). The rollable bodies 261 are disposed between the internally-threaded track groove of the rotatable body 210 and the externally-threaded track groove of the translatable body 240. Ball returns either internally or externally carry the rollable bodies 261 from the end of their path back to the beginning to complete their recirculating track. A return tube 290 attached to or included in the rotatable body 210 can perform recirculation of the rollable bodies 261. The internally-threaded track groove of the rotatable body 210 and the externally-threaded track groove of the translatable body 240 can form a series of ball tracks to provide a helical raceway for reception of a train of recirculating the rollable bodies 261. The rollable bodies 261 may be metal spheres or balls which decrease friction and transfer loads between adjacent components. The rotatable body 210 is rotatably supported by the translatable body 240 via the rollable bodies 261 and a bearing assembly 230. However, in alternative embodiments of the present disclosure, the rotatable body 210 and the translatable body 240 can be directly engaged with each other without the rollable bodies 261.

The bearing assembly 230 is configured to rotatably support the drive mechanism 200 (200-1, 200-2) for rotation of the rotatable body 210 of the drive mechanism 200 (200-1, 200-2) relative to a non-rotating structure of the brake system 10, for example, but not limited to, the housing 600. And, the bearing assembly 230 is configured to transfer the axial load of clamp force to the housing 600 to react. The bearing assembly 230 may be positioned between the rotatable body 210 of the drive mechanism 200 (200-1, 200-2) and the non-rotating structure or housing 600. The non-rotating structure or housing 600 may cover at least a part of the bearing assembly 230 such that the bearing assembly 230 can be seated in the non-rotating structure or housing 600.

The bearing assembly 230 may have a rotatable race 231 (e.g. an inner race), a non-rotatable race 232 (e.g. an outer race or ring), and a plurality of rollable bodies 233 (e.g., bearing balls). The bearing assembly 230 may include any number of rollable bodies 233, for example, more than four balls. The non-rotatable outer race 232 may be located concentrically about the rotatable inner race 231, with the rollable bodies 233 therebetween, in a plane generally perpendicular to a rotatable axis T of the rotatable body 210 of the drive mechanism 200 (200-1, 200-2) or the rotatable inner bearing race 231 or a translatable axis T of the translatable body 240 of the drive mechanism 200 (200-1, 200-2). In an embodiment illustrated in FIGS. 2 and 3, the rotatable inner bearing race 231 is integrated with the rotatable body 210 of the drive mechanism 200 (200-1, 200-2) as one single piece to provide a simpler assembly process and reducing manufacturing cost, although not limited thereto. Alternatively, the rotatable inner bearing race 231 may be provided as a separate piece from the rotatable body 210 of the drive mechanism 200 (200-1, 200-2) and be fixedly coupled to the rotatable body 210 of the drive mechanism 200 (200-1, 200-2).

The specific structures of the drive mechanism 200 (200-1, 200-2) described above and shown in FIGS. 2 and 3 are exemplary embodiments for illustration purposes only. The present disclosure is not limited to these structures of the drive mechanism 200 (200-1, 200-2). Any drive mechanism having a rotatable body configured to be rotatable by the actuator assembly 500 and a linear movable body configured to be translatable according to the rotation of the rotatable body can be applied to some exemplary embodiments of the present disclosure.

The brake system 10 may further comprise a flexible boot 300. The boot 300 can provide a seal interior to the housing 600 of the brake system 10 to prevent water, dirt, and other contaminants from entering into the inside of the housing 600 of the brake system 10 (for example, an inner bore formed by an inside wall of the housing 600) and contaminating the fluid or components contained inside the housing 600 of the brake system 10. The boot 300 can serve as a cover for enclosing the interior of the inner bore of the housing 600 of the brake system 10. A plurality of flexible convolutions may be provided in a main body of the boot 300. For instance, the main body of the boot 300 can have accordion style overlapping folds that enable to expand and retract. The boot 300 may be formed from any suitable material. Preferably, the boot 300 is fabricated from a flexible material such as rubber, silicon, elastic, flexible plastic, polymer and the like so that the boot 300 can be movable, deformable, and/or pliable material without tearing or otherwise becoming damaged when a linearly movable component of the brake system 10 (e.g. the piston or brake pad footing 205 or the translatable body 240 of the drive mechanism 200 (200-1, 200-2)) to which one end of the boot 300 is coupled moves. The boot 300 may prevent the linearly movable component of the brake system 10, to which one end of the boot 300, from rotating. The boot 300 may be designed to function as a roll back seal to retract the linearly movable component of the brake system 10 toward the inside of the inner bore of the housing 600 when the brake is released. The boot 300 may extend between the housing 600 of the brake system 10 and one of linearly movable components of the brake system 10 to provide an extensible and collapsible seal therebetween. For instance, one end of the boot 300 is coupled to the piston or brake pad footing 205 or the translatable body 240 of the drive mechanism 200 and the other end of the boot 300 is coupled to the housing 600.

Referring to FIGS. 3 and 4, the actuator assembly 500 is configured to rotate the rotatable body 210 of the drive mechanism 200 (200-1, 200-2), such as the nut 210 of the screw-nut mechanism 200. The actuator assembly 500 may comprise a motor 520 and a multi-stage drive mechanism 540.

The motor 520 may be fixedly mounted in the housing 600 and have a motor rotor shaft 522. The motor 520 may be an electric motor configured to convert electrical energy into mechanical energy by generating force in the form of rotary torque applied on the motor rotor shaft 522. The motor 520 may be electrically connected to a circuit board having memory, one or more processors, and electric components, or an electric connector via one or more electrical conductors connected to an external device. The motor 520 may be actuated and controlled by the circuit board or the external device for providing the desired rotational speed and rotational direction of the motor rotor shaft 522 of the motor 520.

The motor rotor shaft 522 of the motor 520 is operably connected to the multi-stage drive mechanism 540 to rotate the rotatable body 210 of the drive mechanism 200 (200-1, 200-2).

Further, a motor position sensor 535 may be disposed in sensing relationship with the motor rotor shaft 522. For example, the motor position sensor 535 may be positioned adjacent to the distal end of the motor rotation shaft 522. The motor position sensor 535 is responsive to the rotation of the motor rotation shaft 522. For example, the motor position sensor 535 and the motor rotation shaft 522 are configured such that the motor position sensor 535 can detect the rotational speed and/or rotational direction of the motor rotation shaft 522. Furthermore, the motor position sensor 535 and the motor rotation shaft 522 may be configured such that the motor position sensor 535 can detect the angular position of the motor rotation shaft 522. The motor position sensor 535 may generate an output signal indicative of the detected status of the motor 520.

The motor position sensor 535 and the motor rotation shaft 522 can be any suitable device(s) for generating signal responsive to the rotation of the motor rotation shaft 522. For example, the motor position sensor 535 can be a non-contact limit switch. The motor position sensor 535 may be a Hall effect sensor. Correspondingly, the motor rotation shaft 522 may include a magnetic gradient 529 formed on a surface of the motor rotation shaft 522 defined by a plurality of alternating north and south magnetically charged elements circumferentially spaced about the circumference of the motor rotation shaft 522. The magnetically charged elements 529 of the motor rotation shaft 522 can be any suitable component or material capable of retaining a magnetic charge. The magnetically charged elements 529 of the motor rotation shaft 522 can be formed and/or mounted on the surface of the motor rotation shaft 522 or can be disposed internally in the motor rotation shaft 522. For example, the magnet 529 for sensing the motor position may be pressed on the distal end of the motor rotation shaft 522.

The multi-stage drive mechanism 540 may be, for example, but not limited to, a dual-stage drive mechanism comprising a first-stage belt drive mechanism 541 and a second-stage gear assembly 546. However, the multi-stage drive mechanism 540 may have three or more stages of drive mechanisms. The multi-stage drive mechanism 540 may be configured to multiply torque from the motor 520 to supply the multiplied rotary force to the rotatable body 210 of the drive mechanism 200 (200-1, 200-2).

The first stage belt mechanism 541 may comprise a drive pulley 524, a drive belt 542 and a driven pulley 543.

The drive pulley 524 may be formed directly on the motor rotor shaft 522 or attached to the motor rotor shaft 522. For example, the drive pulley 524 may be directly machined on the circumferential surface of the motor rotor shaft 522 to be coupled with the drive belt 542. In an alternative example, the drive pulley 524 may be mounted to and pressed in the motor rotor shaft 522 as a separate piece. The drive pulley 524 may be located adjacent to a distal end of the motor rotor shaft 522.

The drive pulley 524 may have an outer surface that engages an inner surface of the drive belt 542. The outer surface of the drive pulley 524 can have any suitable contour or texture to help ensure a gripping contact between the drive belt 542 and the drive pulley 524. For example, the outer surface of the toothed pulley 524 and the inner surface of the drive belt 542 can include toothed mating protrusions and/or notches formed therein. The drive pulley 524 may have alternating teeth and grooves on its outer surface to be meshed with alternating grooves and teeth formed on the inner surface of the drive belt 542.

The drive pulley 524 of the motor rotor shaft 522 and the driven pulley 543 of the first-stage belt mechanism 541 are rotatably connected to each other via the drive belt 542. Each of the drive pulley 524 and the driven pulley 543 has an outer surface that engages an inner surface of the drive belt 542. The surfaces of the drive pulley 524 and the driven pulley 543 can have any suitable contour or texture to help ensure a gripping contact between the belt 542 and the pulleys 524, 543. For example, the surfaces of the pulleys 524 and 543 and the inner surface of the belt 542 can include toothed mating protruding and/or notches formed therein.

The drive belt 542 is fit relatively snugly about the outer circumferences of the drive pulley 524 and the driven pulley 543. Thus, rotational movement of the drive pulley 524 of the motor rotor shaft 522 causes rotation of the driven pulley 543 of the first-stage belt mechanism 541. The diameters of the pulleys 524 and 543 can be any suitable dimension for providing any desired gear ratio, such that the rotational speed of the drive pulley 524 of the motor rotor shaft 522 is different from the rotational speed of the driven pulley 543 of the first-stage belt mechanism 541. The diameter of the driven pulley 543 may be greater than the diameter of the drive pulley 524 of the motor rotation shaft 522. Preferably, the reduction ratio of the first-stage belt mechanism 541 may be 4:1 to 10:1 to efficiently provide appropriate brake force, although not limited thereto.

The drive belt 542 may be made from any suitable material or combination of materials flexible enough to loop around the pulleys 524 and 543 and maintain engagement with the outer surfaces of the pulleys 524 and 543 during rotation thereof. The drive belt 542 may be a vee belt or a cog belt, or may be made of individual links forming a chain. The drive belt 542 may be made of an elastomeric material, and may include internal metallic reinforcing members.

The first-stage belt mechanism 541 may further comprise an idler 560. The idler 560 is used to engage the drive belt 542 to provide appropriate tension in the drive belt 542. The idler 560 may be disposed adjacent to the drive belt 542 and configured to adjust a tension of the drive belt 542. The idler 560 can be operatively in contact with the drive belt 542. The idler 560 may contact the drive belt 542 at a location between the drive pulley 524 and the driven pulley 543. The idler 560 may have, for example, but not limited to, an eccentrically mounted, circular idler pulley 562. The eccentric idler pulley can rotate about a fastener or shaft 561 which is eccentrically offset from the center of the eccentric idler pulley 562. The idler 560 may be installed on the front cover 521 of the housing 600 accommodating the motor 520.

The multi-stage drive mechanism 540 may further comprise an intermediate shaft 545 operably connecting the first-stage belt mechanism 541 to the second-stage gear mechanism 546. For example, the intermediate shaft 545 may connect the driven pulley 543 of the first-stage belt mechanism 541 to a drive gear 548 of the second-stage gear assembly 546 in order to deliver rotary torque, generated by the motor 520 and transmitted through the first-stage belt drive mechanism 541, to the second-stage gear mechanism 546. The diameters of the driven pulley 543 of the first-stage belt mechanism 541 and the drive gear 548 of the second-stage gear mechanism 246 may be any suitable dimension for providing the optimized reduction ratio and motor output torque. For example, the diameter of the driven pulley 543 of the first-stage belt mechanism 541 may be larger than the diameter of the drive gear 548 of the second-stage gear mechanism 546 to multiply the torque transmitted from the first-stage belt mechanism 541. The intermediate shaft 545 may be positioned substantially axially parallel to the motor rotor shaft 522 to reduce the package size of the actuator assembly 500, however the orientation of the intermediate shaft 545 may be altered. The translatable body 240 of the first screw-nut mechanism 200-1 may be arranged between the motor 520 and the intermediate shaft 545 to efficiently use the inside space of the housing 600.

The intermediate shaft 545 has a first portion where the driven pulley 243 of the first-stage belt mechanism 541 is provided and a second portion where the drive gear 548 of the second-stage gear mechanism 546 is provided. The driven pulley 543 and/or the drive gear 548 may be directly or integrally formed on the outer circumferential surface of the intermediate shaft 545 as one single piece by a machining or molding process. Alternatively, the driven pulley 243 and/or the drive gear 548 may be assembled and fixed to the intermediate shaft 545 as a separate piece.

In operation, the first stage belt mechanism 541 multiplies the torque from the motor 520 by using the drive pulley 524 and the driven pulley 543 of the first-stage belt mechanism 541 rotatably connected by the drive belt 542, and the torque multiplied by the first-stage belt mechanism 541 is delivered to the second-stage gear mechanism 546 through the intermediate shaft 545.

The driven pulley 543 provided on the intermediate shaft 545 has an inner wall 551 fixedly coupled to the intermediate shaft 545, an outer wall 552 having an outer surface rotatably engaged with the drive belt 542, and a space 553 between the inner wall 551 and the outer wall 552. One or more bearings 554 configured to rotatably support the inner wall 551 of the driven pulley 543 may be disposed inside the space 553 formed between the inner wall 551 and the outer wall 552 of the driven pulley 543 to efficiently use the inner space of the housing 600 of the actuator assembly 500 and reduce the package size of the actuator assembly 500. The outer race of the bearing 554 is formed on or fixed to the housing 600, and the inner race of bearing 554 is fixedly coupled to the inner wall 551 of the driven pulley 543. A part of the housing 600 may protrude toward the inner space 553 of the driven pulley 543 to accommodate the bearing 554 therein.

The intermediate shaft 545 may have a flange 555 protruding radially from an outer circumferential surface of the intermediate shaft 545 to support at least a part of one side of the driven pulley 543 of the first-stage belt mechanism 541 fixedly coupled to the intermediate shaft 545.

The multi-stage drive mechanism 540 may further include the second-stage gear mechanism 546. The second-stage gear mechanism 546 may comprise the drive gear 548, the first gear 549-1 of the rotatable body 210 of the first mechanism 200-1 and the second gear 549-2 of the rotatable body 210 of the second mechanism 200-2. The second-stage gear mechanism 546 may be configured to further multiply the torque delivered from the first-stage belt mechanism 541 and provide the multiplied rotary torque to the rotatable bodies 210 of the first and second drive mechanisms 200-1 and 200-2, such as the nuts 210 of the first and second screw-nut mechanisms 200-1 and 200-2.

The drive gear 548 may be formed directly on the intermediate shaft 545 or mounted to the intermediate shaft 545. For example, the tooth of the drive gear 548 may be directly machined or molded on the circumferential surface of the intermediate shaft 545 to be engaged with both the first gear 549-1 of the first drive mechanism 200-1 and the second gear 549-2 of the second drive mechanism 200-2. Alternatively, the drive gear 548 may be mounted to and pressed in the intermediate shaft 545 as a separate piece.

Both the first gear 549-1 of the first drive mechanism 200-1 and the second gear 549-2 of the second drive mechanism 200-2 are rotatably engaged with the drive gear 547. The drive gear 547, the first gear 549-1 of the first drive mechanism 200-1, and the second gear 549-2 of the second drive mechanism 200-2 may be arranged in a same plane as each other. The first and second gears 549-1 and 549-2 of the first and second drive mechanism 200-1 and 200-2 may be formed directly on a part of the circumferential surface of the rotatable bodies or nuts 210 of the first and second drive mechanism 200-1 and 200-2, respectively, or be mounted to the rotatable bodies 210 of the first and second drive mechanism 200-1 and 200-2, respectively. For example, the tooth of the first gear 549-1 of the first drive mechanism 200-1 and the second gear 549-2 of the second drive mechanism 200-2 may be directly machined or molded on the outer circumferential surfaces of the rotatable bodies 210 of the first drive mechanism 200-1 and the second drive mechanism 200-2, respectively, to have toothed mating protrusions and/or notches formed thereon. Alternatively, the first gear 549-1 of the first drive mechanism 200-1 and the second gear 549-2 of the second drive mechanism 200-2 may be fixedly mounted to the rotatable bodies 210 of the first drive mechanism 200-1 and the second drive mechanism 200-2, respectively, as a separate piece as shown in FIGS. 3 and 4.

The drive gear 547 rotatably engages both the first gear 549-1 of the first drive mechanism 200-1 and the second gear 549-2 of the second drive mechanism 200-2 such that the rotation of the drive gear 547 can cause both the first gear 549-1 of the first drive mechanism 200-1 and the second gear 549-2 of the second drive mechanism 200-2 to rotate simultaneously. Then, according to the rotation of the first gear 549-1 of the first drive mechanism 200-1 and the second gear 549-2 of the second drive mechanism 200-2, the rotatable body 210 of the first drive mechanism 200-1 and the rotatable body 210 of the second drive mechanism 200-2 rotate, and the rotation of the rotatable body 210 of the first drive mechanism 200-1 and the rotatable body 210 of the second drive mechanism 200-2 causes the translatable body 240 of the first drive mechanism 200-1 and the translatable body 240 of the second drive mechanism 200-2 to be linearly moved. A direction of linear movement of the translatable body 240 of the first drive mechanism 200-1 and the translatable body 240 of the second drive mechanism 200-2 the translatable body 240 is different depending on a direction of rotation of the rotatable body 210 of the first drive mechanism 200-1 and the rotatable body 210 of the second drive mechanism 200-2. As the rotatable body 210 of the first drive mechanism 200-1 and the rotatable body 210 of the second drive mechanism 200-2 rotate in an expanding direction, the translatable body 240 of the first drive mechanism 200-1 and the translatable body 240 of the second drive mechanism 200-2 linearly translate with respect to the rotatable body 210 of the first drive mechanism 200-1, the rotatable body 210 of the second drive mechanism 200-2 and the housing 600 so that the translatable body 240 of the first drive mechanism 200-1 and the translatable body 240 of the second drive mechanism 200-2 can translate out from the rotatable body 210 of the first drive mechanism 200-1, the rotatable body 210 of the second drive mechanism 200-2 and the housing 600 towards the brake rotor 125 in order for the piston or brake pad footing 205 to push or clamp the brake pad assembly 120 toward the brake rotor 125 to apply brake. As the rotatable body 210 of the first drive mechanism 200-1 and the rotatable body 210 of the second drive mechanism 200-2 rotate in a collapsing direction, the translatable body 240 of the first drive mechanism 200-1 and the translatable body 240 of the second drive mechanism 200-2 linearly translate with respect to the rotatable body 210 of the first drive mechanism 200-1, the rotatable body 210 of the second drive mechanism 200-2 and the housing 600 so that the translatable body 240 of the first drive mechanism 200-1 and the translatable body 240 of the second drive mechanism 200-2 can linearly move toward the rotatable body 210 of the first drive mechanism 200-1, the rotatable body 210 of the second drive mechanism 200-2 and the housing 600 in a direction away from the brake rotor 125 in order for the piston or brake pad footing 205 to move away from the brake rotor 125 to release the brake.

Both the first gear 549-1 of the first drive mechanism 200-1 and the second gear 549-2 of the second drive mechanism 200-2 are rotated by one single drive gear 547, and therefore a threaded direction of the threaded grooves of the rotatable body 210 and the translatable body 240 of the first drive mechanism 200-1 and a threaded direction of the threaded grooves of the rotatable body 210 and the translatable body 240 of the second drive mechanism 200-2 are the same as each other.

The rotary torque by the first gear 549-1 of the first drive mechanism 200-1 and the second gear 549-2 of the second drive mechanism 200-2 for rotating the rotatable bodies 210 of the first drive mechanism 200-1 and the second drive mechanism 200-2 may be adjusted or scalable depending on the specific force torque requirements by varying the torque of the motor 520, the diameters of the pulleys 524 and 543 and the gears 548, 549-1 and 549-2, and/or the belt and gear reduction ratios.

According to some embodiments of the present disclosure, the multiple drive mechanisms 200 including the first drive mechanism 200-1 and the second drive mechanism 200-2 can produce higher clamp forces (for example, 65 kN and greater) using one motor 520. And, because the multiple drive mechanisms 200 can have two locations or points of force application to the brake pad assembly (or brake lining assembly) 120, contact surface areas to the brake pad assembly (or brake lining assembly) 120 can be increased, thereby gaining greater distribution of the clamp force of the drive mechanisms 200 and reducing the deflection of the brake pad assembly (or brake lining assembly) 120.

According to certain embodiments of the present disclosure, by having dual drive mechanisms, such as the first drive mechanism 200-1 and the second drive mechanism 200-2, the stress of each of the first and second drive mechanisms 200-1 and 200-2 can be reduced by half of the total clamp force, thereby reducing the total hertzian contact stress on the ball nut races of the first and second drive mechanisms 200-1 and 200-2 and reducing to the total length of the first and second drive mechanisms 200-1 and 200-2 which is needed to meet life and durability requirements of the brake system 10. And, the axial space or length for the first and second drive mechanisms 200-1 and 200-2 can be reduced by at least half, and therefore an overall axial packaging space of the brake system 10 can be reduced while at least the same clamp force can be generated compared to a single drive mechanism.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electromechanical brake system comprising:

a pair of screw-nut mechanisms comprising first and second screw-nut mechanisms, each screw-nut mechanism comprising a rotatable body configured to be rotatable and a translatable body operably coupled with the rotatable body, the translatable body configured to be axially translatable relative to the rotatable body to move a brake pad assembly according to rotation of the rotatable body, wherein the rotatable body of the first screw-nut mechanism is provided with a first gear and the rotatable body of the second screw-nut mechanism is provided with a second gear;

an actuator assembly configured to provide a torque; and a drive gear rotatably engaged between the first gear of the rotatable body of the first screw-nut mechanism and the second gear of the rotatable body of the second screw-out mechanism and operably connected to the actuator assembly to be rotated by the torque of the actuator, wherein the actuator assembly comprises:

a motor having a motor shaft, and a belt drive mechanism operably connecting between the motor shaft and the drive gear engaged between the first and second gears of the rotatable bodies of the first and second screw-nut mechanisms.

2. The electromechanical brake system of claim 1, wherein the drive gear is configured to rotate both the first gear of the rotatable body of the first screw-nut mechanism and the second gear of the rotatable body of the second screw-nut mechanism simultaneously by the torque of the actuator to rotate the rotatable body of the first screw-nut mechanism and the rotatable body of the second screw-nut mechanism simultaneously.

3. The electromechanical brake system of claim 1, wherein the translatable body of the first screw-nut mechanism and the translatable body of the second screw-nut mechanism are operably coupled to the brake pad assembly so that the translatable body of the first screw-nut mechanism and the translatable body of the second screw-nut mechanism simultaneously move the brake pad assembly according to the rotation of the rotatable body of the first screw-nut mechanism and the rotatable body of the second screw-nut mechanism to apply or release brake.

4. The electromechanical brake system of claim 1, wherein:

the first gear is fixed to the rotatable body of the first screw-nut mechanism, and the second gear is fixed to the rotatable body of the second screw-nut mechanism.

5. The electromechanical brake system of claim 1, wherein:

teeth of the first gear are directly formed on the rotatable body of the first screw-nut mechanism, and teeth of the second gear are directly formed on the rotatable body of the second screw-nut mechanism.

6. The electromechanical brake system of claim 1, wherein diameters of the first gear of the first screw-nut mechanism and the second gear of the second screw-nut mechanism are larger than a diameter of the drive gear rotatably engaged between the first gear and the second gear.

7. The electromechanical brake system of claim 1, wherein:

the rotatable body and the translatable body of the first screw-nut mechanism and the rotatable body and the translatable body of the second screw-nut mechanism have threaded grooves, and a threaded direction of the threaded grooves of the rotatable body and the translatable body of the first screw-nut mechanism and a threaded direction of the threaded grooves of the rotatable body and the translatable body of the second screw-nut mechanism are same as each other.

8. The electromechanical brake system of claim 1, wherein the drive gear, the first gear of the rotatable body of the first screw-nut mechanism and the second gear of the rotatable body of the second screw-nut mechanism are arranged on a same plane as each other.

9. The electromechanical brake system of claim 1, wherein the belt drive mechanism comprises:

a drive belt;

a drive pulley provided on the motor shaft; and a driven pulley connected to the drive pulley of the motor shaft via the drive belt, wherein the driven pulley is provided on an intermediate shaft operably connecting between the belt drive mechanism and the drive gear.

10. The electromechanical brake system of claim 9, wherein a diameter of the drive pulley provided on the motor shaft is smaller than a diameter of the driven pulley provided on the intermediate shaft operably connecting between the belt drive mechanism and the drive gear.

11. The electromechanical brake system of claim 10, wherein the intermediate shaft has a first portion where the driven pulley of the belt drive mechanism connected to the drive pulley of the motor shaft is provided and a second portion where the drive gear engaged between the first and second gears of the rotatable bodies of the first and second screw-nut mechanisms is provided.

12. The electromechanical brake system of claim 9, wherein the driven pulley of the belt drive mechanism connected to the drive pulley of the motor shaft via the drive belt is fixed to the intermediate shaft operably connecting between the belt drive mechanism and the drive gear.

13. The electromechanical brake system of claim 9, wherein the intermediate shaft operably connecting between the belt drive mechanism and the drive gear has a flange protruding radially from an outer circumferential surface of the intermediate shaft to support at least a part of one side of the driven pulley of the belt drive mechanism fixedly coupled to the intermediate shaft.

14. The electromechanical brake system of claim 9, wherein:

the driven pulley provided on the intermediate shaft operably connecting between the belt drive mechanism and the drive gear has an inner wall fixedly coupled to the intermediate shaft and an outer wall having an outer surface rotatably engaged with the drive belt, and one or more bearings configured to rotatably support the inner wall of the driven pulley are disposed inside a space formed between the inner wall and the outer wall of the driven pulley.

15. The electromechanical brake system of claim 1, wherein:

the rotatable body of the first screw-nut mechanism has an inner race of a first bearing rotatably supporting the rotatable body of the first screw-nut mechanism and the first gear rotatably engaged with the drive gear, and the rotatable body of the second screw-nut mechanism has an inner race of a second bearing rotatably supporting the rotatable body of the second screw-nut mechanism and the second gear rotatably engaged with the drive gear.

16. The electromechanical brake system of claim 1, wherein:

a diameter of the first gear of the first screw-nut drive mechanism is larger than an outer diameter of the rotatable body of the first screw-nut drive mechanism, and a diameter of the second gear of the second screw-nut drive mechanism is larger than an outer diameter of the rotatable body of the second screw-nut drive mechanism.

* * * * *